April 19, 1938.  D. F. TAYLOR  2,114,549
DISK HARROW
Filed April 14, 1937  2 Sheets-Sheet 2
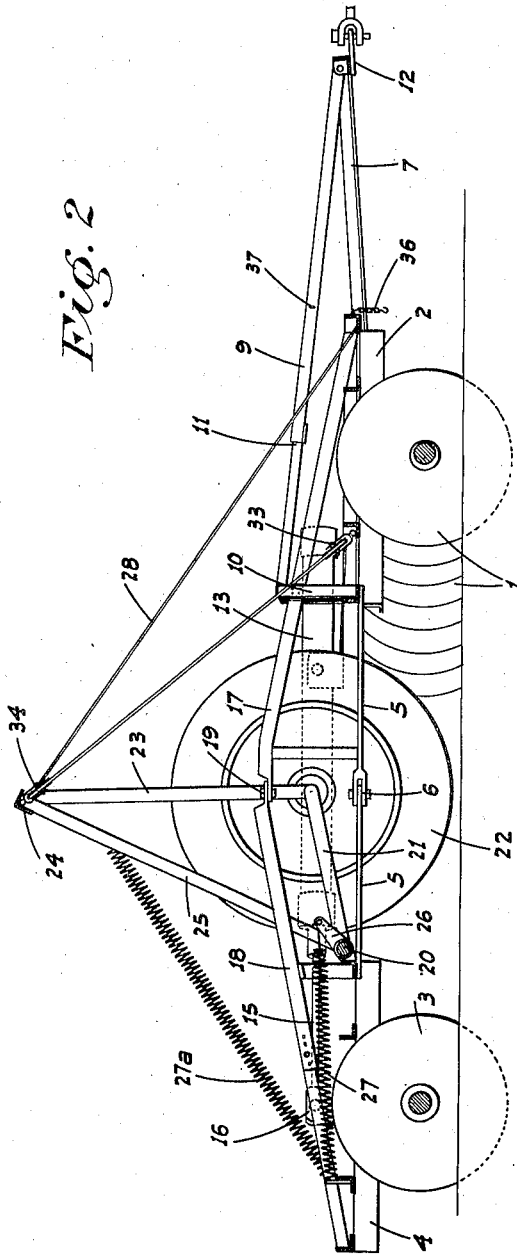
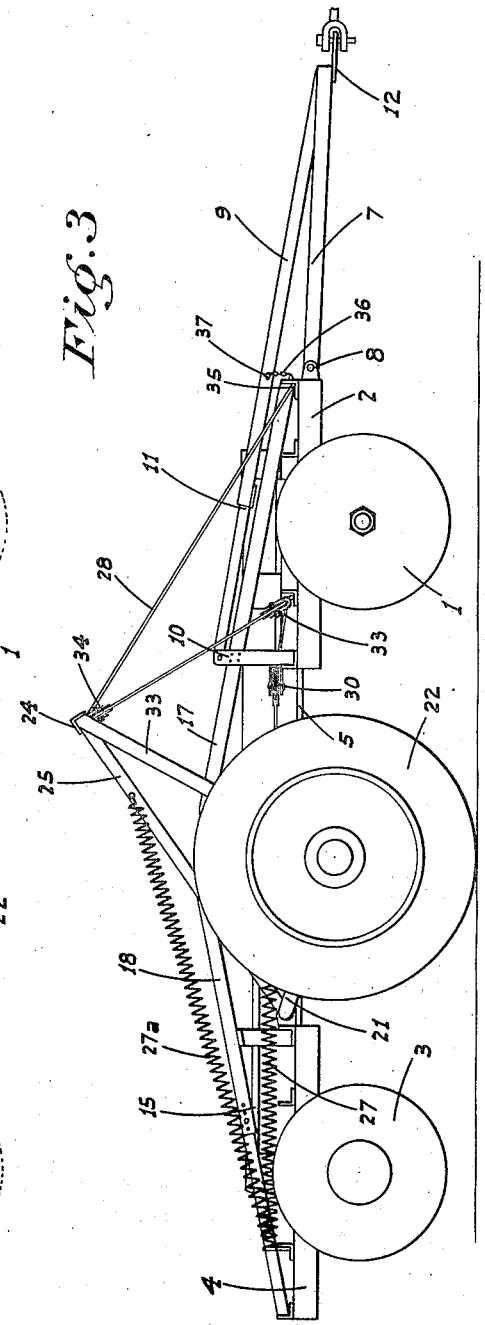
INVENTOR
*D. F. Taylor*
BY
ATTORNEY Patented Apr. 19, 1938

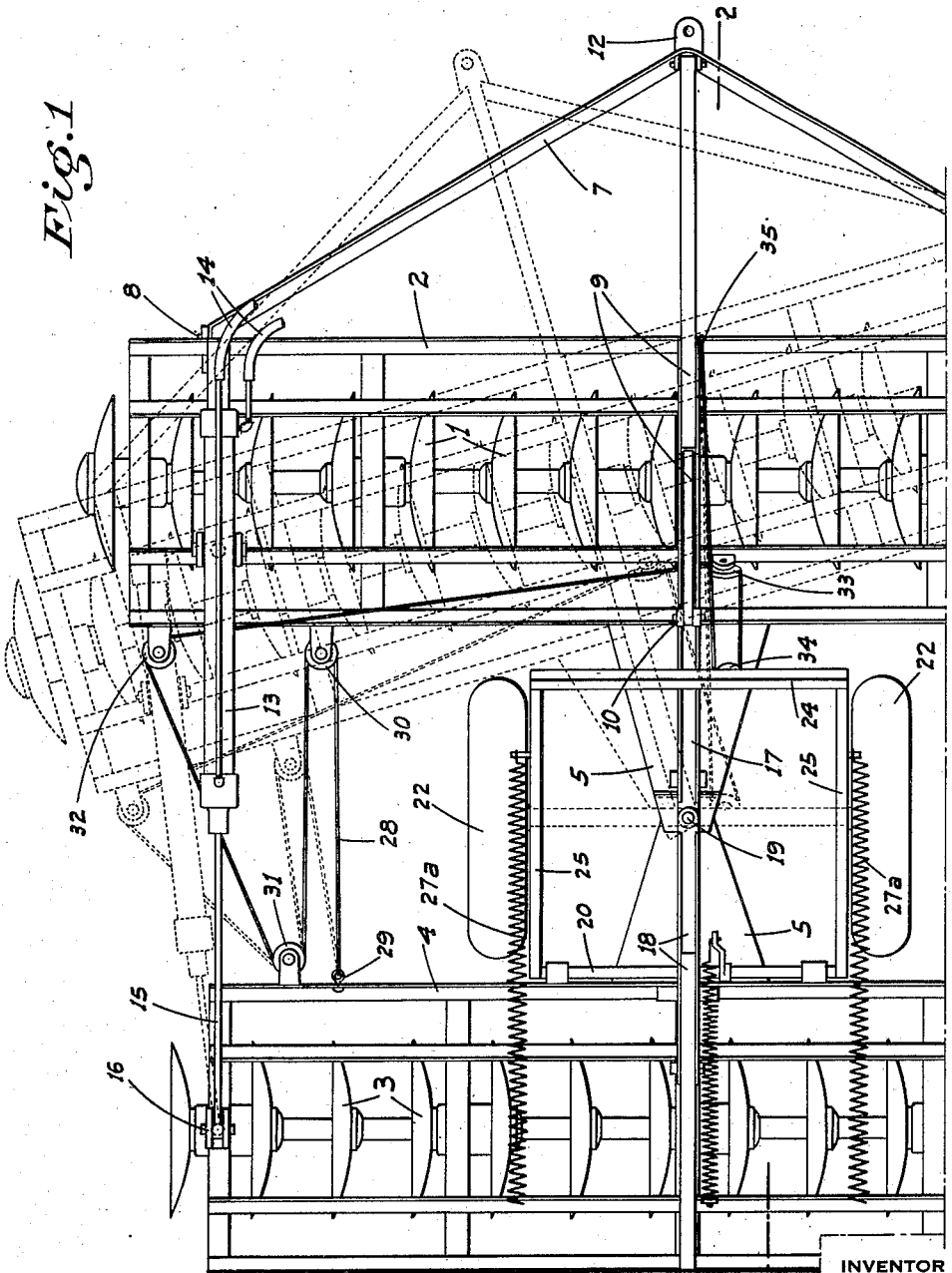

2,114,549

UNITED STATES PATENT OFFICE 2,114,549

DISK HARROW

Donald F. Taylor, Hughson, Calif.

Application April 14, 1937, Serial No. 136,842

6 Claims. (Cl. 55—83)

This invention relates generally to a disk harrow, and in particular is directed to a disk harrow of the two gang type and wherein the gangs are arranged in tandem relation.

The principal object of my invention is to provide a disk harrow, of the two gang type, arranged in combination with wheels mounted for selective engagement with the ground and so that when the wheels are moved to a ground engaging position, the disk gangs may be raised clear of the ground in order to facilitate transportation of the implement from place to place.

A further object of my invention is to provide a two gang disc harrow having the wheel structure referred to in the paragraph above and a power control mechanism to shift the gangs from a parallel position to an angled working position and vice-versa; the wheel structure being so arranged that upon the gangs being shifted to an angled working position the wheels will simultaneously raise clear of the ground, and upon the gangs being shifted to a parallel position the wheels will simultaneously move to a ground engaging position and the disk gangs lifted clear of the ground.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a fragmentary top plan of my improved disk harrow with the gangs in parallel transporting position; the relative angled position of the gangs being shown in dotted lines.

Figure 2 is a sectional elevation taken on line 2—2 of Fig. 1, but with the disks in lowered working position.

Figure 3 is a side elevation of the implement in transporting position.

Referring now more particularly to the characters of reference on the drawings, the device comprises a front disk gang comprising disks 1 journaled beneath a frame 2 and a rear disk gang comprising disks 3 journaled beneath another frame 4; as is usual practice in disk gang construction. The front and rear gangs are pivoted together intermediate their ends by means of plates 5 which project toward each other from adjacent sides of the frames and are pivoted together as at 6. By thus securing the front and rear gangs together they may be shifted from a parallel position to an angled position relative to each other.

The implement is provided with a draft hitch which comprises forwardly and converging bars 7, such bars being pivoted at their rear ends to the front frame adjacent its ends as at 8. Another bar unit 9 extends rearward and upward from the junction of the bars 7 and is fixed at its rear end to an upstanding frame member 10 which is fixed centrally on the front frame at its rear edge, said other bar unit 9 being freely telescopic as shown particularly at 11. A draft connection 12 of any suitable type is fixed to and projects forwardly from the junction of the bars 7 and 9. A double acting hydraulic cylinder 13 provided with the usual liquid control pipes 14 is swivelly mounted on the front frame transversely thereof adjacent one end. The piston rod of the double acting control cylinder extends rearwardly and is swivelly connected as at 16 to the rear frame at the corresponding end. The liquid control pipes 14 of course extend forward to the tractor and are there suitably connected with the pressure pump and control valve for the liquid which is employed to actuate the cylinder 13.

A bracing beam 17 is fixed to the forward edge of the front frame 2 intermediate the ends thereof and projects rearwardly and upwardly, while another bracing frame 18 is connected to and extends forwardly and upwardly from the rear edge of the rear frame intermediate the ends thereof, said beams 17 and 18 being pivoted together at adjacent ends as at 19. The pivot 19 is vertically alined with the pivot 6 which connects the two plates 5. The front bracing beam 17 is fixed intermediate its ends to the upstanding frame member 10 in order to strengthen the same, and the rear bracing frame 18 although normally of fixed length is arranged for telescopic adjustment as shown.

A transverse shaft 20 is rotatably journaled on the front edge of the rear frame 4 and is provided with forwardly projecting parallel arms 21. Wheels 22 are supported from the forward ends of the arms 21 on the outside thereof, said wheels preferably being of the automotive type and provided with rubber tires. Vertical arms 23 are fixed at their lower ends to the forward ends of arms 21 and project upwardly therefrom, a cross member 24 being secured between the upper ends of said arms 23. Braces 25 extend from the top of arms 23 downwardly and rearwardly to a fixed connection at their lower ends with the rear ends of arms 21. The shaft 20, arms 21, upstanding arms 23, cross member 24 and braces 25 all form in effect a rigid wheel carrying frame which is swingable about shaft 20 as an axis. A radial lever arm 26 projects upwardly from shaft 20 and a tension spring 27 is connected between the upper end of said lever arm 26 and the rear portion of the rear frame, said tension spring tending to hold the wheel supporting frame in raised position. Other tension springs 27a may extend from braces 25 to the rear end of the rear gang: A control cable 28 is fixed at one end to an eye 29 on the front edge of the rear frame and extends forward about a sheave 30 on the rear edge of the front frame, then extends back about another sheave 31 on the rear frame adjacent the eye 29, passes outward to a sheave 32 on the rear edge of the front frame immediately adjacent the outer end thereof. From this point the control cable 28 extends to a sheave 33 on the front frame near the center thereof and at a point to one side of bracing frame 17, the cable running upward from sheave 33 to a sheave 34 secured to the cross member 24 and then back down to the forward edge of the front frame where it is dead-ended as at 35.

Operation

When the front and rear gangs are shifted from an angled working position to a parallel position by the retraction of the piston rod of the double acting control cylinder, the reaches of the control cable extending from sheave 33 to sheave 34 and from sheave 34 to the dead end connection at 35 are materially shortened due to the fact that the distance between sheaves 30 and 31 is increased. This causes the wheel supporting frame to be lowered about its axis bringing the wheels into engagement with the ground and then raising the front and rear disk gangs clear of the ground in the manner shown in Fig. 3. In such position, the implement may be transported rapidly over highways etc. without interference from the disks. A short chain 36 is secured to the front frame and is hooked to an eye 37 to maintain the front gang from tilting down when the implement is being transported.

The bar 11 is freely telescopic in order that the hitch frame may swing relative to the front frame when the implement is adjusted from one position to another. The rear frame brace 18 is selectively telescopic in order that the rear gang may be adjusted up or down to control the working depth of the harrow.

From a transporting position with the gangs parallel, the implement is shifted to an angled and lowered position for working by causing the projection of the piston rod of the hydraulic control cylinder, the adjacent reaches of the cable being shortened, lengthening the reaches between sheaves 34 and 33 and between sheave 34 and the dead end as at 35. This allows the weight of the gangs etc. to lower them to the ground and to a working position and the tension springs 27 and 27a to raise the wheel frame so that the wheels clear the ground.

If desired, the gangs when in angled working position may be moved somewhat toward a parallel position in order to bring the wheels to a partially lowered position so as to facilitate turning of the harrow in the field or to control the working depth of said gangs.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a disk harrow of the two gang type, front and rear gangs connected together for relative angular shifting movement in a horizontal plane, means to shift the gangs, a pair of wheels, means mounting the wheels in connection with the gangs for relative raising and lowering movement, and means to raise and lower said wheel mounting means, said last named means being arranged to operate simultaneously with the operation of the gang shifting means.

2. In a disk harrow of the two gang type, front and rear gangs swivelly connected together and normally disposed in an angled working position, means to shift the gangs to a substantially parallel position, a pair of wheels, means mounting the wheels in connection with the gangs for relative raising and lowering movement, means normally holding the wheels in raised position, and means operable upon shifting of the gangs toward a parallel position to lower the wheels.

3. In a disk harrow of the two gang type, front and rear gangs connected together for relatively angular shifting movement, said gangs being spaced apart, means to shift the gangs, a pair of wheels, a wheel supporting frame pivoted in offset relation to the axis of the wheels on one gang for raising or lowering movement between the gangs, and means to raise or lower said frame, said means being arranged to operate simultaneously with the gang shifting means.

4. A device as in claim 1 in which said last named means lowers the frame upon shifting movement of the gangs in a direction to decrease the angular relation thereof.

5. In a disk harrow of the two gang type, front and rear gangs swivelly connected together intermediate their ends for relative angular shifting movement and normally disposed in angled relation, said gangs being spaced apart, means to shift the gangs, a pair of wheels, a wheel supporting frame pivoted on the rear gang adjacent its front edge and projecting forward between the gangs for raising or lowering movement, said frame including an arm upstanding from the forward portion thereof, a spring to exert a frame raising tension, a control cable connected to the arm adjacent its upper end and extending about a sheave on the forward gang and thence to a fixed connection on the rear gang; said sheave and connection being disposed on that side of the swivel connection of the gangs which will shorten the reach of the cable between said arm and sheave with decrease in angular relation of the gangs whereby to draw the frame to a lowered position.

6. A device as in claim 3 in which said gang shifting means comprises a hydraulic control cylinder swivelly mounted on one gang with the outer end of the piston rod of the cylinder swivelly connected to the other gang.

DONALD F. TAYLOR.